(12) United States Patent
Nakao

(10) Patent No.: US 7,019,488 B2
(45) Date of Patent: Mar. 28, 2006

(54) BATTERY POWER SOURCE DEVICE OF ELECTRIC POWER VEHICLE

(75) Inventor: Yoshitada Nakao, Toyohashi (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 0 days.

(21) Appl. No.: 10/489,615

(22) PCT Filed: Nov. 28, 2002

(86) PCT No.: PCT/JP02/12468

§ 371 (c)(1),
(2), (4) Date: Mar. 23, 2004

(87) PCT Pub. No.: WO03/047902

PCT Pub. Date: Jun. 12, 2003

(65) Prior Publication Data

US 2005/0077874 A1    Apr. 14, 2005

(30) Foreign Application Priority Data

Dec. 6, 2001   (JP) .............................. 2001-372624

(51) Int. Cl.
*H02J 7/00* (2006.01)
(52) U.S. Cl. ....................................... 320/104
(58) Field of Classification Search ................ 320/104, 320/116, 118, 136, 132, 147, 152, 153, DIG. 18, 320/DIG. 21
See application file for complete search history.

(56) References Cited

U.S. PATENT DOCUMENTS

| | | | | |
|---|---|---|---|---|
| 5,850,351 A | * | 12/1998 | Lotfy et al. | ................. 700/286 |
| 6,020,717 A | | 2/2000 | Kadouchi et al. | ........... 320/116 |
| 6,104,967 A | * | 8/2000 | Hagen et al. | ............... 700/293 |
| 6,140,820 A | * | 10/2000 | James | ........................ 324/434 |

(Continued)

FOREIGN PATENT DOCUMENTS

CA          798839       * 10/1997

(Continued)

OTHER PUBLICATIONS

English Language Abstract of JP 2000-74786.

(Continued)

*Primary Examiner*—Pia Tibbits
(74) *Attorney, Agent, or Firm*—Greenblum Bernstein, P.L.C.

(57) ABSTRACT

Communication is provided for each of battery ECUs so that the battery ECUs are connected through a connection cable to communicate with each other. Operating power is constantly supplied to the battery ECU used as a master while being supplied to the battery ECUs used as slaves through a relay contact. When a vehicle stops running, the master battery ECU controls the relay contact to be turned OFF after collecting necessary data of each of the slave battery ECUs to store therein. When the vehicle restarts running, the master battery ECU turns the relay contact ON to transmit the necessary data to each of the slave battery ECUs.

5 Claims, 4 Drawing Sheets

U.S. PATENT DOCUMENTS

| | | | |
|---|---|---|---|
| 6,252,376 B1 * | 6/2001 | Nakamura et al. | 320/132 |
| 6,291,972 B1 * | 9/2001 | Zhang | 320/118 |
| 6,486,637 B1 * | 11/2002 | Nakanishi et al. | 320/150 |
| 6,762,590 B1 * | 7/2004 | Yudahira | 320/135 |
| 6,803,766 B1 * | 10/2004 | Kobayashi et al. | 324/434 |
| 6,828,798 B1 * | 12/2004 | Morimoto | 324/527 |
| 6,919,707 B1 * | 7/2005 | Kawai et al. | 320/117 |
| 2003/0129457 A1 | 7/2003 | Kawai et al. | 320/117 |

FOREIGN PATENT DOCUMENTS

| | | | |
|---|---|---|---|
| GB | 2341258 | * | 3/2000 |
| GB | 1308739 | * | 5/2003 |
| GB | 1317045 | * | 6/2003 |
| JP | 11150873 | | 6/1999 |
| JP | 2000-74786 | | 3/2000 |
| JP | 2000133318 | * | 5/2000 |
| JP | 2001309563 | * | 2/2001 |
| JP | 2001196102 | * | 7/2001 |
| JP | 2002354703 | | 12/2002 |

OTHER PUBLICATIONS

English Language Abstract of JP 11-150873.
English Language Abstract of JP 2002-354703.

* cited by examiner

BATTERY POWER SOURCE DEVICE OF ELECTRIC POWER VEHICLE

TECHNICAL FIELD

The present invention relates to a battery power source device of an electric power vehicle, for supplying large electric power, which is to be applied to a large-size electric power vehicle.

BACKGROUND ART

A battery power source device, which is used as a power source of an electric vehicle or a hybrid vehicle, is constituted as follows. A plurality of (for example, six) rechargeable batteries are connected in series to constitute a battery module. Furthermore, a plurality of (for example, thirty) battery modules are connected in series to constitute a battery pack block. In order to manage an operating state of the battery pack block, a battery ECU (Electronic Control Unit), which detects a voltage, a current, and a temperature of the battery pack block so as to detect the abnormality or to perform various controls in accordance with the results of detections, is provided. A battery power source device used for a hybrid vehicle has been known as such a battery power source device. The battery power source device is constituted to supply driving electric power to a motor for driving a vehicle to run and to be charged by electric power from a generator of the vehicle.

In the case of a large-size vehicle requiring larger electric power, it is designed to connect battery pack systems, each obtained by the combination of the battery pack block and the battery ECU, in series, in parallel or in a combination of serial and parallel. FIG. 3 shows the structure of a battery power source device, in which six battery pack blocks 31 are connected in a combination of serial and parallel so as to respond to the requirements of large electric power. A battery ECU 32 is connected to each of the battery pack blocks 31. Each of the battery pack blocks 31 which are connected in a combination of serial and parallel is connected to a positive electrode charge/discharge terminal 41 and a negative electrode charge/discharge terminal 42. An operating state of each of the battery pack blocks 31 is monitored and controlled by each of the battery ECUs 32.

Sensors (not shown) for detecting a voltage of each of the battery modules, a charge/discharge current of the battery pack block 31, one or a plurality of battery temperatures at one or a plurality of points of a representative battery module, and an ambient temperature of the battery pack block 31 are provided for the battery pack block 31. An output obtained by detection of each sensor is input to each of the battery ECUs 32. The battery ECU 32 monitors an operating state of and the occurrence of abnormality in the battery pack block 31 based on the outputs obtained by detections of the input voltage, current, and temperature. At the same time, the battery ECU 32 controls cooling means such as a blower fan provided for the battery pack block 31, based on the output obtained by the detection of the temperature. Moreover, the battery ECU 32 computes an SOC (State of Charge=Quantity of accumulated electricity with respect to a battery capacity) based on the outputs of detection of the input voltage, current, and temperature. The outputs of detections such as the SOC or the voltage are externally output as operating state data of the battery pack block 31. In the case of a hybrid vehicle, the outputs of detections are input to an ECU for controlling a vehicle so as to be employed as charge/discharge control for the battery power source device.

In the case where a plurality of battery pack systems are combined to constitute a battery power source device as described above, since a battery ECU is provided for each battery pack block, the amount of electric power consumed by the battery ECU increases. Therefore, in the case where a vehicle stops for an extended period of time, there is a problem that the amount of discharge of the battery used as a power source of the battery ECU increases.

Moreover, when a vehicle stops running to be out of operation, each battery ECU stores necessary data at that moment. Each battery ECU uses the stored necessary data to start operating when the vehicle starts running again. Therefore, it is necessary to provide a non-volatile memory for storing data. As a result, as the number of battery ECUs increases, the cost adversely increases because a non-volatile memory must be provided for each battery ECU.

An object of the present invention is to provide a battery power source device of an electric power vehicle for solving problems in the case where a plurality of battery packs are combined to constitute the battery power source device.

DISCLOSURE OF THE INVENTION

The present invention for achieving the above object is a battery power source device of an electric power vehicle, including: a plurality of battery pack blocks connected in any one of parallel or a combination of serial and parallel so as to be used for charge and discharge at a vehicle side, each of the battery pack blocks being provided by connecting a plurality of rechargeable batteries in series; and battery ECUs provided for the respective battery pack blocks, each managing an operating state of each of the battery pack blocks, so that information is exchanged between the battery ECUs and a vehicle ECU mounted onto the vehicle, wherein an address is set for each of the battery ECUs and communication means is provided for each of the battery ECUs so that the battery ECUs are connected with each other through a communication line; one of the plurality of battery ECUs is set to be a master, whereas the other battery ECUs are set to be slaves, so that operating power is supplied to each of the slave battery ECUs through switching means; when running stop information is input from the vehicle ECU to the master battery ECU, the master battery ECU collects necessary data from each of the slave battery ECUs to store therein and then controls the switching means to be turned OFF to shutoff the power supply to each of the slave battery ECUs; and when running start information is input from the vehicle ECU to the master battery ECU, the master battery ECU controls the switching means to be turned ON to supply power to each of the slave battery ECUs and to transmit the stored necessary data to each of the slave battery ECUs.

According to the above-described configuration, one of the plurality of battery ECUs is used as a master battery ECU, whereas the other battery ECUs are used as slave battery ECUs so that necessary data is collected from the slave battery ECUs to the master battery ECU by the communication means to be stored therein when the vehicle stops running. Therefore, it is not necessary to provide storage means, for storing data for the slave battery ECUs while the power supply to the slave battery ECUs is shutoff. Accordingly, the power consumption of the battery ECUs is reduced. Even in the case where the vehicle stops for an extended period of time, the consumption of a power source battery is restrained. When the vehicle starts running, the power is supplied to each of the slave battery ECUs, while the master battery ECU transmits the stored necessary data back to each of the slave battery ECUs. Therefore, the slave battery ECUs execute normal battery management.

In the above-described configuration, the operating power is constantly supplied to the master battery ECU. However, when a non-volatile memory is provided for the master battery ECU so that the supply of operating power is shutoff after the necessary data of the master battery ECU and the slave battery ECUs are stored in the non-volatile memory in the case where the electric motor vehicle stops running for a predetermined period of time or more, the power consumption during a vehicle stop will be further reduced for a vehicle that has a strong possibility of stopping for a long period of time.

BEST MODE FOR CARRYING OUT THE INVENTION

Hereinafter, an embodiment of the present invention will be described with reference to the accompanying drawings for understanding of the present invention. The following embodiment is merely an example of embodying the present invention, and does not limit a technical scope of the present invention.

This embodiment describes a battery power source device applied to a power source for driving a hybrid vehicle which runs on both a motor and an engine, in particular, a large-size hybrid vehicle.

Figure 1:
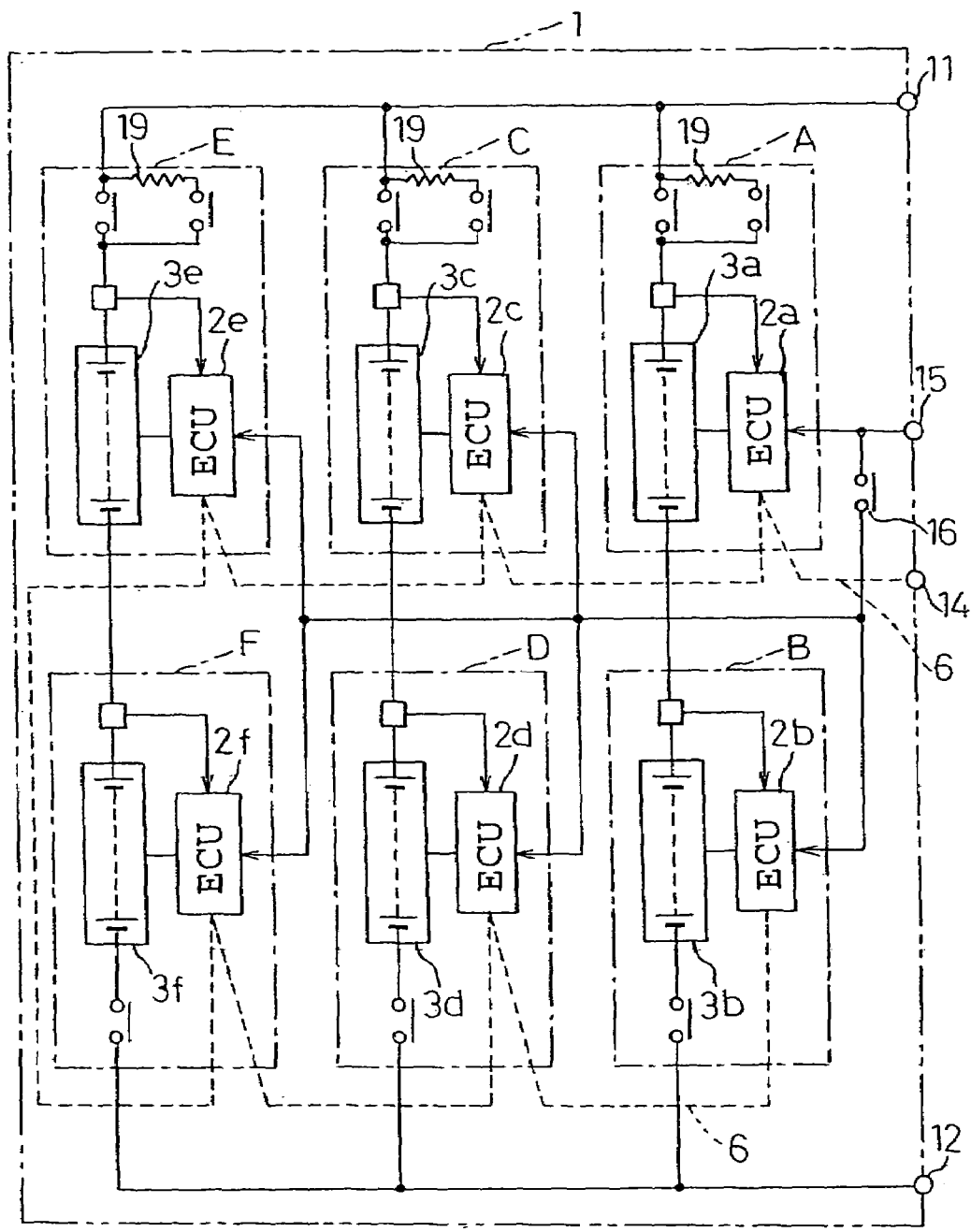
FIG. 1 is a block diagram showing a configuration of a battery power source device according to an embodiment of the present invention.

In order to respond to a requirement of high electric power by a large-size hybrid vehicle, a battery power source device 1 according to this embodiment is constituted as follows by using six battery pack blocks 3a to 3f connected in a combination of serial and parallel. As shown in FIG. 1, the battery pack block 3a and the battery pack block 3b, the battery pack block 3c and the battery pack block 3d, and the battery pack block 3e and the battery pack block 3f, are connected in series, respectively. Three pairs obtained by serial connection are further connected in parallel. With this structure, a large output voltage and a large output current are supplied.

Figure 4:
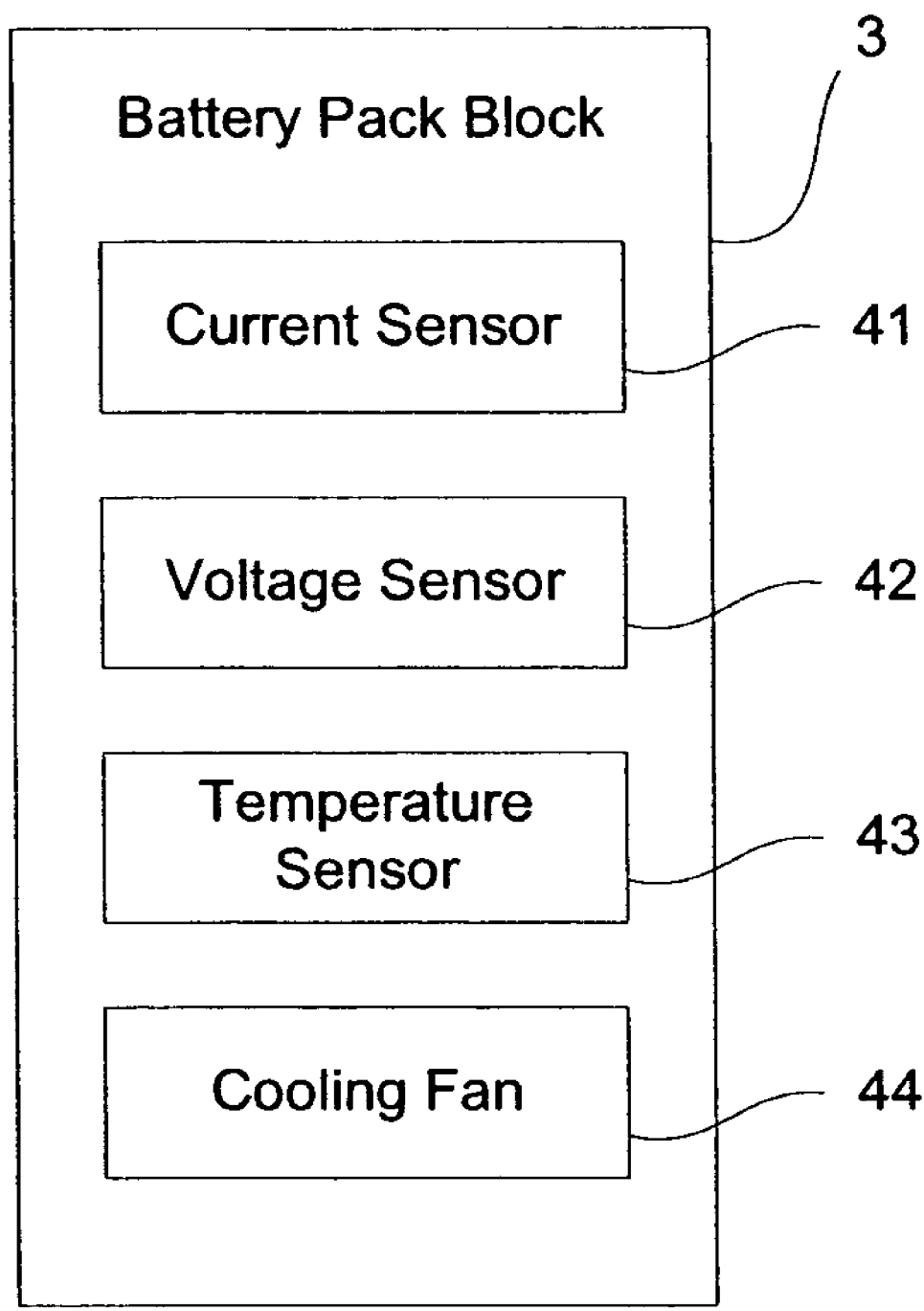
FIG. 4 is a block diagram showing a configuration of a battery pack block according to an embodiment of the present invention.

Each of the battery pack blocks 3a to 3f is obtained by connecting forty battery modules, each being constituted by six nickel metal hydride rechargeable batteries in series, and is constituted with detection means such as a current sensor and a voltage sensor, a temperature sensor and the like or a cooling fan for cooling the battery. FIG. 4 illustrates an exemplary battery pack block 3 which includes a current sensor 41, a voltage sensor 42, a temperature sensor 43, and a cooling fan 44. Battery ECUs 2a to 2f are respectively connected to the battery pack blocks 3a to 3f to constitute battery pack systems A to F.

Each of the battery ECUs 2a to 2f monitors an operating state of each of the battery pack blocks 3a to 3f and controls the rotation of the cooling fan 44, based on a charge/discharge current and a charge/discharge voltage of each of the battery pack blocks 3a to 3f, a voltage and a representative temperature per battery module, an air temperature (ambient temperature) for cooling the battery pack blocks 3a to 3f, which are detected by the current sensor 41, the voltage sensor 42, and the temperature sensor 43. At the same time, each of the battery ECUs 2a to 2f computes an SOC corresponding to the quantity of accumulated electricity with respect to a battery capacity, from the detected values of the voltage, the current, and the temperature so as to request a vehicle ECU corresponding to a control unit for the vehicle to obtain discharge and charge states that allow the SOC to be appropriately maintained. Moreover, when an abnormal state is detected based on the results of detections of the voltage, the current, and the temperature and the results of computation of the SOC, an abnormality occurrence signal is output to the vehicle ECU.

Each of the battery ECUs 2a to 2f is provided with a network interface (communication means). The battery ECUs 2a to 2f are connected through a connection cable (communication line) 6 by using the network interfaces to constitute a battery network. The battery network is connected from a network terminal 14 to a vehicle network on the vehicle side, through which the battery network is connected to the vehicle ECU. The battery network is constituted so that the battery ECU 2a of the battery pack system A functions as a master whereas the battery ECUs 2b to 2f of the other battery pack systems B to F function as slaves.

Moreover, as operating power of each of the battery ECUs 2a to 2f, a DC voltage of 12V is supplied from the vehicle through a power source terminal 15. The electric power is constantly supplied to the battery ECU 2a serving as the master from the power source terminal 15, whereas the electric power is supplied to the other battery ECUs 2b to 2f serving as the slaves through a relay contact (switching means) 16. The relay contact 16 is controlled to open and close by the master battery ECU 2a.

Figure 2:
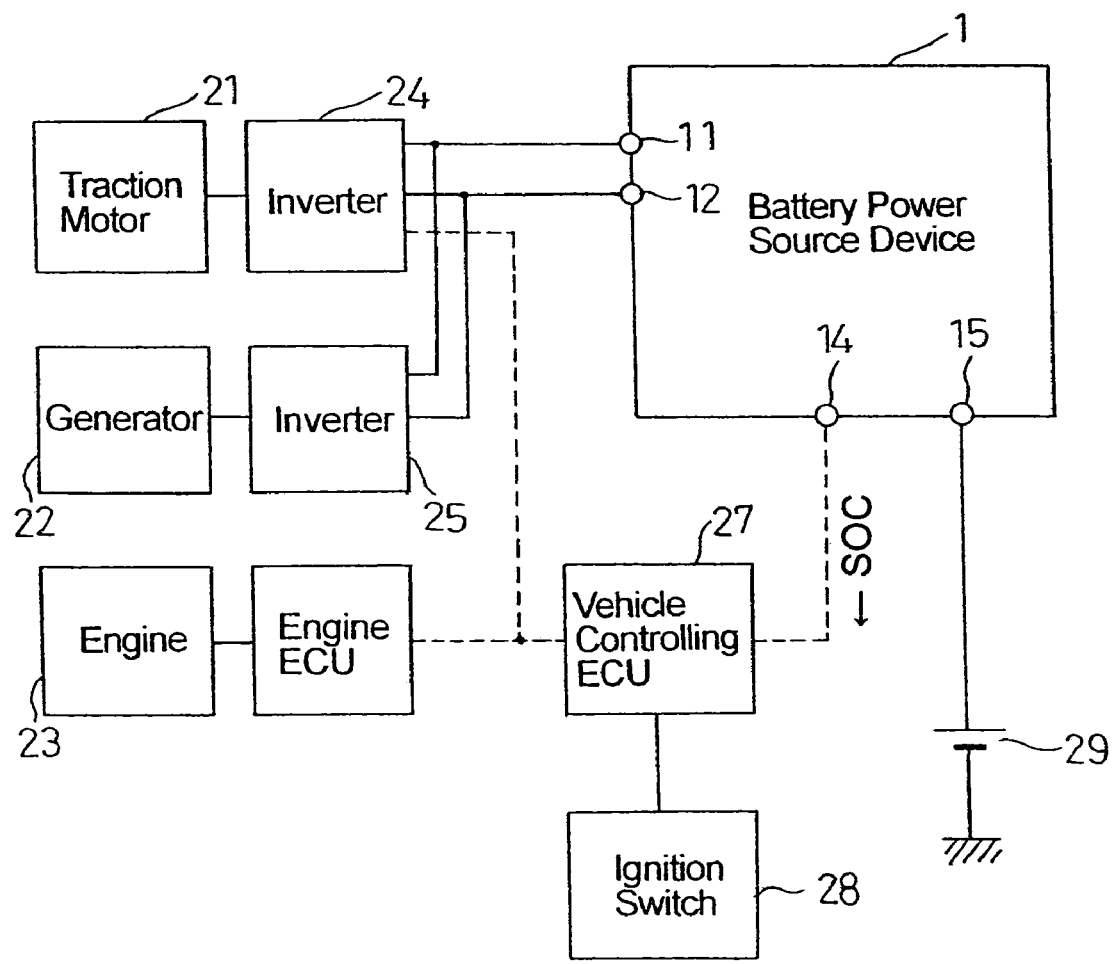
FIG. 2 is a block diagram showing a configuration of a principal part on a vehicle side.
Figure 3:
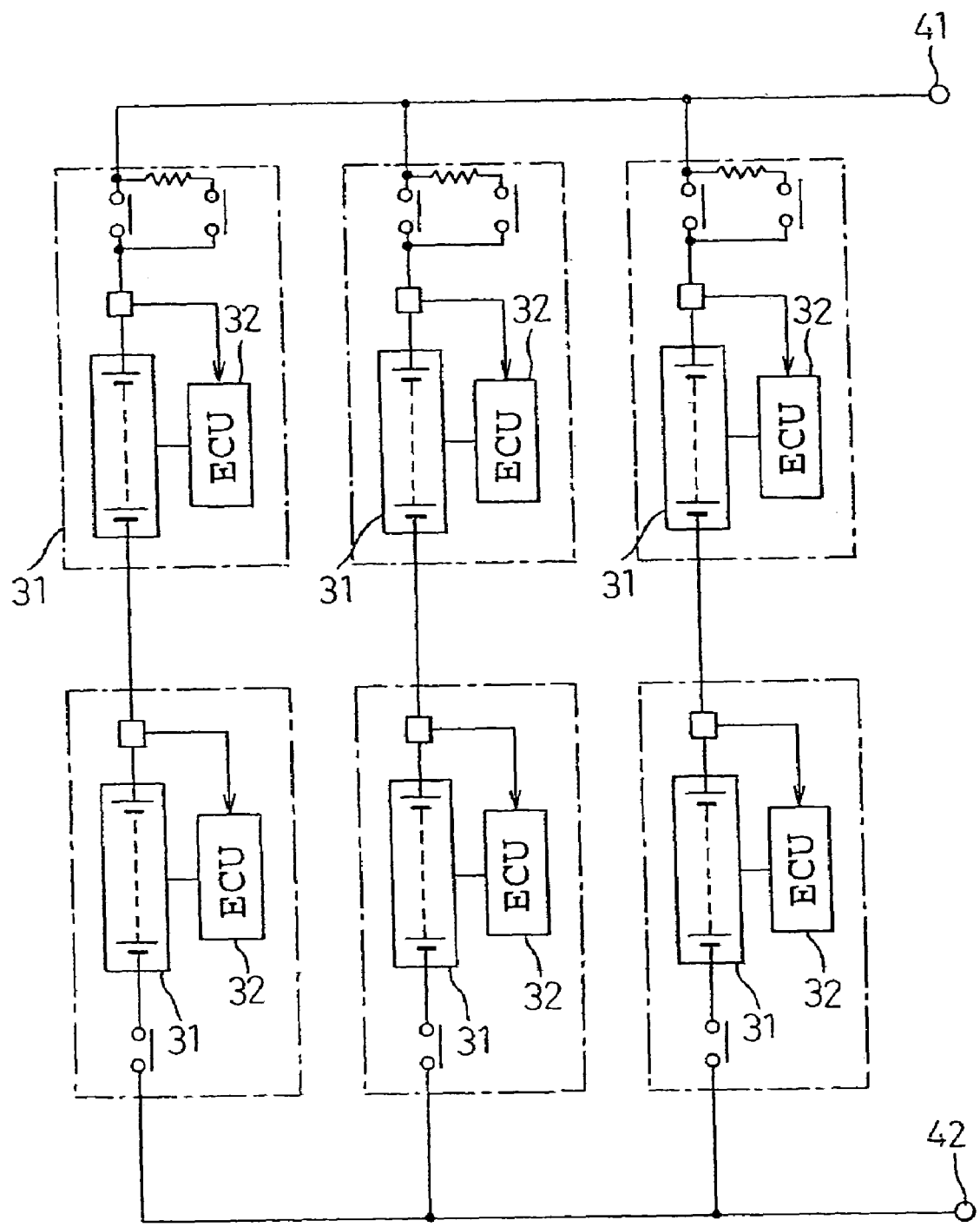
FIG. 3 is a block diagram showing a configuration of a battery power source device according to a conventional model.

The battery power source device 1 having the above structure is mounted onto a vehicle so as to drive a traction motor 21 through an inverter 24 by discharge electric power from the positive electrode charge/discharge terminal 11 and the negative electrode charge/discharge terminal 12, as shown in FIG. 2. An output of power generated from a generator 22 mounted onto the vehicle is input through an inverter 25 to the battery power source device 1 from the positive electrode charge/discharge terminal 11 and the negative electrode charge/discharge terminal 12 as charging power so as to be used for charging each of the battery pack blocks 3a to 3f. The charge and the discharge of the battery power source device 1 are controlled by a vehicle ECU 27 in accordance with the SOC status of the battery ECUs 2a to 2f or a running status of the vehicle.

In the above structure, when an ignition switch 28 of the vehicle is turned OFF by a driver to stop the vehicle, the information is input from the vehicle ECU 27 through the vehicle network to the master battery ECU 2a from the network terminal 14. The master battery ECU 2a collects SOC data from each of the slave battery ECUs 2b to 2f through the battery network so as to store the collected SOC data in an embedded memory. The SOC data is stored in the memory with an address of each of the slave battery ECUs 2b to 2f. When the collection and the storage of the data are completed, the master battery ECU 2a operates a power source relay to control the relay contact 16 to be turned OFF. Since the power source of each of the slave battery ECUs 2b to 2f is disconnected as a result of the control, the power consumption of a vehicle rechargeable battery 29 is prevented from uneconomically increasing during a stop of operation of the vehicle.

The ignition switch 28 is turned ON when the vehicle starts running again after the stop of operation. Then, since the information is input from the vehicle ECU 27 to the master battery ECU 2a, the master battery ECU 2a controls the power source relay to turn the relay contact 16 ON so as to activate each of the slave battery ECUs 2b to 2f. Next, the SOC data stored in the memory is transmitted through the battery network to each of the slave battery ECUs 2b to 2f corresponding to the assigned address. Since each of the battery ECUs 2a to 2f is now ready to manage each of the battery pack blocks 3a to 3f, each of the battery ECUs 2a to 2f starts a battery management operation by using the SOC data obtained before the stop of operation. With this structure, it is not necessary to provide a non-volatile memory for storing the SOC data for each of the slave battery ECUs 2b to 2f to which power supply is shutoff. Moreover, since the power is constantly supplied to the master battery ECU 2a, the use of a volatile memory is sufficient as a memory instead of using a non-volatile memory. In addition, each of the battery pack systems A to F has an identical structure. Therefore, owing to the interchangeable common structure, the management cost or the manufacturing cost is intended to be reduced.

The operating power is constantly supplied to the master battery ECU 2a in the above-described embodiment. However, when a non-volatile memory is provided for the master battery ECU 2a, the operation power supply to the master battery ECU 2a will also be shutoff in the case where the vehicle stops for an extended period of time so that the power consumption during a vehicle stop can be further reduced.

The power supply to the master battery ECU 2a is controlled to be shutoff by collecting the SOC data of the slave battery ECUs 2b to 2f through the battery network so as to store the SOC data in the non-volatile memory together with its own SOC data and then controlling a power source self-hold circuit to be turned OFF.

In the case where the power supply to the master battery ECU 2a is to be shutoff, it is suitable to set the power supply to shutoff the power supply about ten minutes to one hour after the vehicle stops running, that is, after the ignition switch 28 is turned OFF. After elapse of about ten minutes to one hour, temperature of the battery increases by charge and discharge while the vehicle has been running decreases so that a temperature of a resistor 19 provided for an anti-rush current circuit decreases to a constant temperature. Thus, the battery is set to be controllable so that vehicle starts running again. Therefore, the above-mentioned period of time serves as an indication for shutoff the power supply to the master battery ECU 2a.

When the vehicle starts running, the ignition switch 28 is turned ON. As a result, the vehicle ECU 27 activates the master battery ECU 2a which in turn operates the power source self-hold circuit to read out its own data and the data of the slave battery ECUs 2b to 2f from the non-volatile memory. Then, the corresponding data is transmitted to each of the slave battery ECUs 2b to 2f. As a result, a status before the vehicle stops is restored so that the vehicle starts running under normal battery management.

INDUSTRIAL APPLICABILITY

According to a battery power source device of the present invention, since one of a plurality of battery ECUs is designated as a master battery ECU and the other battery ECUs are designated as slave battery ECUs, necessary data is collected from the slave battery ECUs to the master battery ECU by communication means to be stored therein when the vehicle stops running. Therefore, since it is not necessary to provide storage means for data storage for the slave battery ECUs, the power supply is shutoff. Accordingly, the battery power source device is suitable for reducing the power consumption of the battery ECUs. At the same time, the battery power source device is also suitable for restraining the power consumption of a power source battery in the case where the vehicle stops for an extended period of time. Moreover, when the vehicle starts running, the power is supplied to each of the slave battery ECUs to transmit the necessary data stored by the master battery ECU back to each of the slave battery ECUs. Therefore, it is suitable or executing normal battery management in the slave battery ECUs.

The invention claimed is:

1. An electric power vehicle power source device, comprising:
    a plurality of battery pack blocks connected in one of parallel and a combination of series and parallel, each of the battery pack blocks including a plurality of rechargeable batteries connected in series; and
    a plurality of battery electronic control units (ECUs) connected with each other through a communication line, each battery ECU corresponding to an address, managing an operating status of a corresponding battery pack block and exchanging information with a vehicle ECU;
    wherein one battery ECU of the plurality of battery ECUs is a master battery ECU and other battery ECUs of the plurality of battery ECUs are slave battery ECUs, such that operating power is supplied to the slave battery ECUs through a switch;
    wherein when stop information is received by the master battery ECU, the master battery ECU collects and stores data from the slave battery ECUs and controls the switch to discontinue the power supply to the slave battery ECUs; and
    wherein when start information is received by the master battery ECU, the master battery ECU controls the switch to supply power to the slave battery ECUs and to transmit the stored data to the slave battery ECUs.

2. The electric power vehicle power source device according to claim 1, wherein operating power is constantly supplied to the master battery ECU.

3. The electric power vehicle power source device according to claim 1, wherein the electric power vehicle power source device is provided to an electric power vehicle,
    wherein the master battery ECU includes a non-volatile memory, and when the electric power vehicle stops running for at least a predetermined period of time, the supply of power to the slave battery ECUs is shutoff after the necessary data of the master battery ECU and the slave battery ECUs are stored in the non-volatile memory.

4. The electric power vehicle power source device according to claim 1, wherein each battery ECU computes a state of charge (SOC) corresponding to a quantity of accumulated electricity with respect to a battery capacity from detected values of voltage, current and temperature, so as to output the SOC to the vehicle ECU.

5. The electric power vehicle power source device according to claim 1, wherein a cooling device is provided with each of the plurality of battery pack blocks, and wherein each battery ECU controls the operation of a cooling device based on a detected temperature of the corresponding battery pack block.

* * * * *